United States Patent [19]
Zellers

[11] Patent Number: 5,899,111
[45] Date of Patent: May 4, 1999

[54] REMOTE WATER LEVEL DETECTOR FOR A FIRE TRUCK

[76] Inventor: Anthony Zellers, 205 Hockenbury Rd., Neshanic Station, N.J. 08853

[21] Appl. No.: 09/105,429

[22] Filed: Jun. 26, 1998

[51] Int. Cl.⁶ .................................................. G01F 23/00
[52] U.S. Cl. ............................. 73/293; 73/290 R; 239/65
[58] Field of Search .................................. 73/290 R, 291, 73/294, 293; 239/65; 137/558

[56] References Cited

U.S. PATENT DOCUMENTS

| | | |
|---|---|---|
| 1,322,359 | 11/1919 | Shelley . |
| 2,663,590 | 12/1953 | Wyatt . |
| 2,810,606 | 10/1957 | Taylor . |
| 4,069,838 | 1/1978 | Hansel et al. . |
| 4,124,049 | 11/1978 | Yamaguchi . |
| 4,247,784 | 1/1981 | Henry ........................................ 73/293 |
| 4,252,274 | 2/1981 | Kubacak . |
| 4,264,991 | 5/1981 | Lasalandra . |
| 4,445,238 | 5/1984 | Maxhimer . |
| 4,523,465 | 6/1985 | Fasching et al. . |
| 4,593,855 | 6/1986 | Forsyth . |
| 4,745,293 | 5/1988 | Christensen ........................... 73/293 X |
| 4,773,161 | 9/1988 | Grenier ................................ 73/290 R |
| 4,936,681 | 6/1990 | Ruhrman ............................... 73/293 X |

*Primary Examiner*—Elizabeth L. Dougherty

[57] ABSTRACT

A foldable water tank remote level detector system is provided including a fire truck having a side extent with an analog gauge mounted thereon. The analog gauge has an indicator pivotally coupled thereto for pivoting between an empty indicia and a full indicia. As such, the gauge is adapted for indicating a level corresponding to a level signal upon the receipt thereof. Also included is a water level sensor situated within a body of water distant the fire truck. The water level sensor is adapted to continuously generate a level signal corresponding with a level of the water within the body of water. Finally, an extension cord is provided having a first end connected to the water level sensor and a second end connected to the gauge outlet of the fire truck thereby transmitting the level signals to the analog gauge.

6 Claims, 2 Drawing Sheets

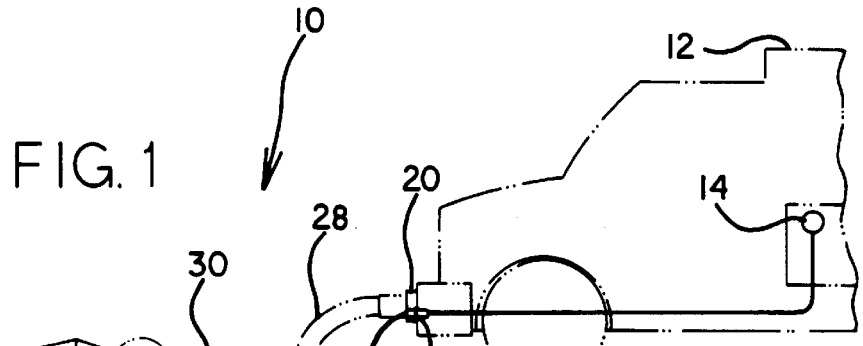
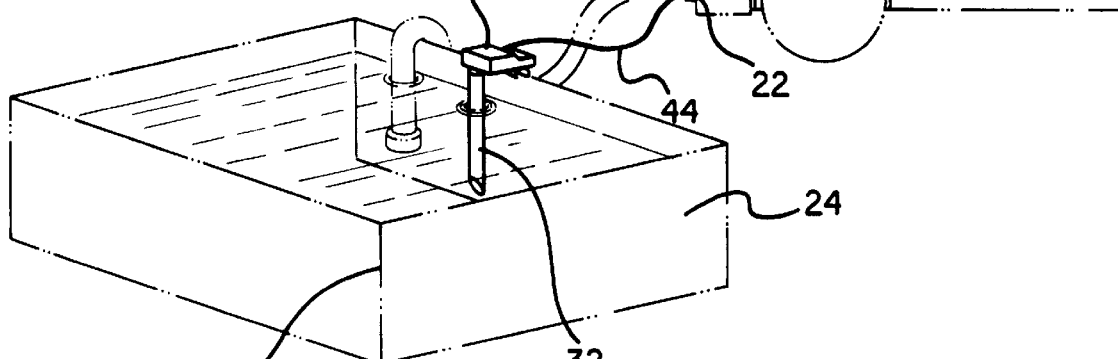
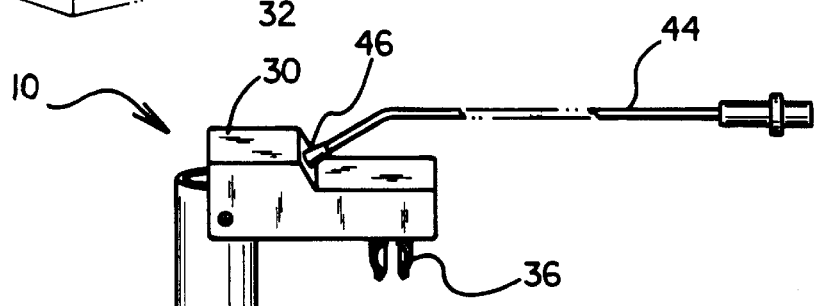
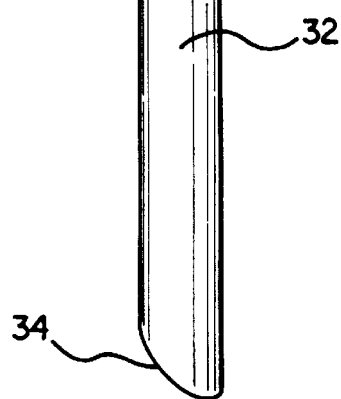
FIG. 1
FIG. 2

REMOTE WATER LEVEL DETECTOR FOR A FIRE TRUCK

BACKGROUND OF THE INVENTION

1. Field of the Invention

The present invention relates to water level detectors and more particularly pertains to a new remote water level detector for a fire truck for allowing a fireman to remain adjacent to a fire truck while monitoring a water level within a foldable water tank.

2. Description of the Prior Art

The use of water level detectors is known in the prior art. More specifically, water level detectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art water level detectors include U.S. Pat. No. 4,342,125; U.S. Pat. No. 4,523,465; U.S. Pat. No. 5,423,214; U.S. Pat. No. 4,445,238; U.S. Pat. No. 4,069,838; and U.S. Pat. Des. 350,489.

In these respects, the remote water level detector for a fire truck according to the present invention substantially departs from the conventional concepts and designs of the prior art, and in so doing provides an apparatus primarily developed for the purpose of allowing a firemen to remain adjacent a fire truck while monitoring a water level within a foldable water tank.

SUMMARY OF THE INVENTION

In view of the foregoing disadvantages inherent in the known types of water level detectors now present in the prior art, the present invention provides a new remote water level detector for a fire truck construction wherein the same can be utilized for allowing a firemen to remain adjacent a fire truck while monitoring a water level within a foldable water tank.

The general purpose of the present invention, which will be described subsequently in greater detail, is to provide a new remote water level detector for a fire truck apparatus and method which has many of the advantages of the water level detectors mentioned heretofore and many novel features that result in a new remote water level detector for a fire truck which is not anticipated, rendered obvious, suggested, or even implied by any of the prior art water level detectors, either alone or in any combination thereof.

To attain this, the present invention generally comprises a fire truck having a side extent with an analog gauge mounted thereon. The analog gauge has an indicator pivotally coupled thereto for pivoting between an empty indicia and a full indicia. As such, the analog gauge is adapted for indicating a level corresponding to a level signal upon the receipt thereof. The fire truck further includes a front end with a water intake inlet and a gauge outlet mounted thereon. It should be noted that the gauge outlet is connected to the analog gauge via a wire. As shown in FIG. 1, the present system includes a foldable water tank. Such tank has a bottom face and a foldable periphery integrally coupled thereto. The periphery is adapted to extend upwardly upon the filling of the tank with water. For removing water from the tank, a fire hose has a first end connected to the water intake inlet of the fire truck and a second end within the tank. It should be noted that a fireman conventionally controls the removal of water from adjacent the side of the fire trunk. As shown in FIGS. 2 & 3, a sensor housing is provided including a top compartment with a top face, a bottom face, an inboard end face, an outboard end face, and a pair side faces defining an interior space. The sensor housing further has a splash abating tube having a top end coupled to the bottom face of the top compartment adjacent the inboard end face thereof. As shown in FIG. 2, the splash abating tube depends downwardly to terminate at an open beveled bottom end. The sensor housing also has an inverted U-shaped clip coupled to the bottom face of the top compartment adjacent the outboard end face thereof. The clip has a pair of arcuate prongs residing in a plane situated perpendicular with respect to the end faces of the housing. As such, the clip is adapted to be releasably mounted on a top edge of the periphery of the foldable tank such that the splash abating tube is situated vertically within the water therein. Next provided is an optical distance sensor mounted on the bottom face of the top compartment of the housing. As shown in FIG. 3, the sensor is situated within the top end of the splash abating tube. In such orientation, the optical distance is adapted to continuously generate a level signal corresponding with a level of the water within the tank. Finally, an extension cord is provided having a first end connected to the optical distance sensor. A second end of the extension cord is releasably connected to the gauge outlet of the fire truck for transmitting the level signals to the analog gauge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote water level detector for a fire truck apparatus and method which has many of the advantages of the water level detectors mentioned heretofore and many novel features that result in a new remote water level detector for a fire truck which is not anticipated, rendered obvious, suggested, or even implied by any of the prior art water level detectors, either alone or in any combination thereof.

It is another object of the present invention to provide a new remote water level detector for a fire truck which may be easily and efficiently manufactured and marketed.

It is a further object of the present invention to provide a new remote water level detector for a fire truck which is of a durable and reliable construction.

An even further object of the present invention is to provide a new remote water level detector for a fire truck which is susceptible of a low cost of manufacture with regard to both materials and labor, and which accordingly is then susceptible of low prices of sale to the consuming public, thereby making such remote water level detector for a fire truck economically available to the buying public.

Still yet another object of the present invention is to provide a new remote water level detector for a fire truck which provides in the apparatuses and methods of the prior art some of the advantages thereof, while simultaneously overcoming some of the disadvantages normally associated therewith.

Still another object of the present invention is to provide a new remote water level detector for a fire truck for allowing a firemen to remain adjacent a fire truck while monitoring a water level within a foldable water tank.

Even still another object of the present invention is to provide a new remote water level detector for a fire truck that includes a fire truck having a side extent with an analog gauge mounted thereon. The analog gauge has an indicator pivotally coupled thereto for pivoting between an empty indicia and a full indicia. As such, the gauge is adapted for indicating a level corresponding to a level signal upon the receipt thereof. Also included is a water level sensor situated within a body of water distant the fire truck. The water level sensor is adapted to continuously generate a level signal corresponding with a level of the water within the body of water. Finally, an extension cord is provided having a first end connected to the water level sensor and a second end connected to the gauge outlet of the fire truck thereby transmitting the level signals to the analog gauge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new remote water level detector for a fire truck according to the present invention.

FIG. 2 is a perspective view of the sensor housing of the present invention.

DESCRIPTION OF THE PREFERRED EMBODIMENT

Figure 3:
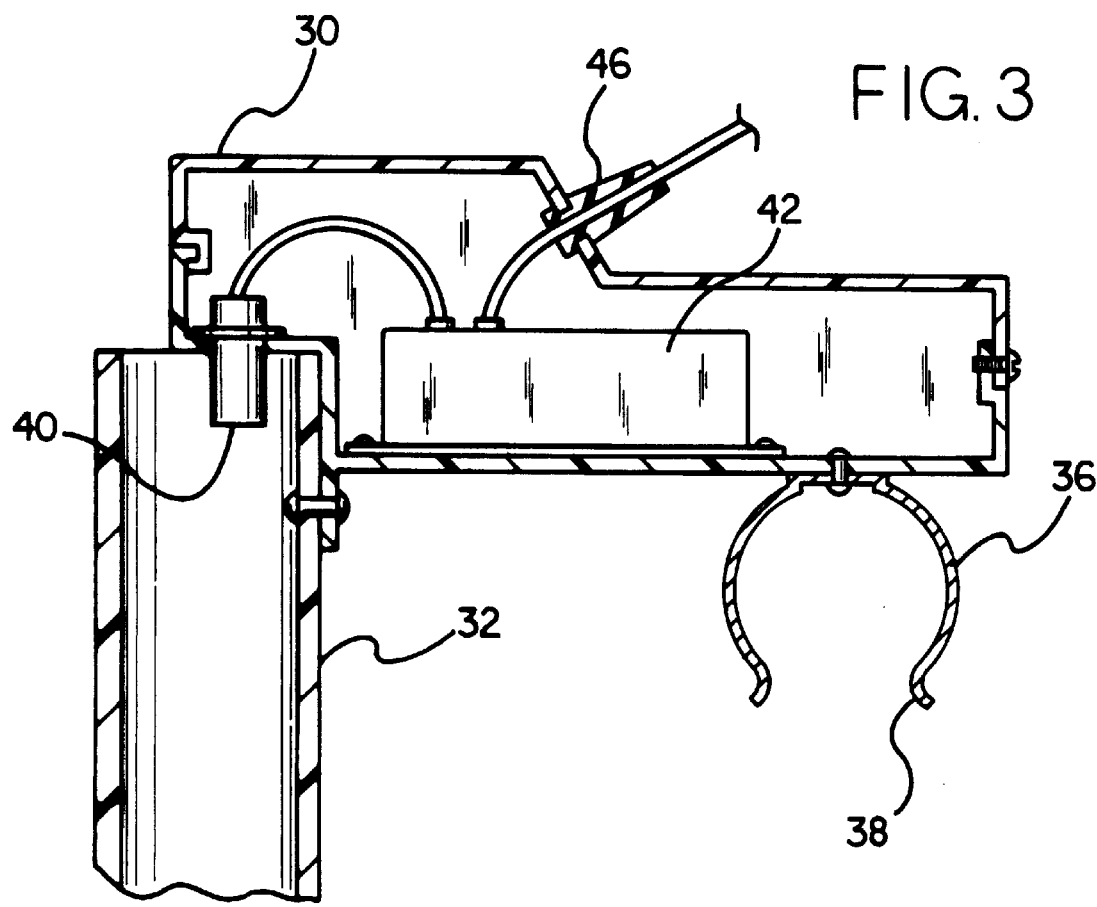
FIG. 3 is a cross-sectional view of the sensor housing of the present invention.
Figure 4:
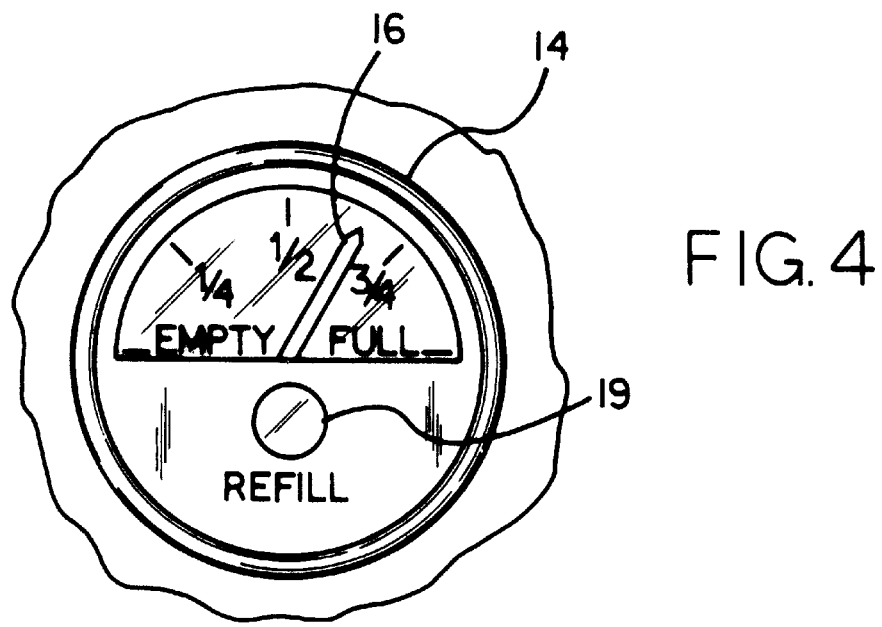
FIG. 4 is a front view of the analog gauge of the present invention.

With reference now to the drawings, and in particular to FIGS. 1 through 4 thereof, a new remote water level detector for a fire truck embodying the principles and concepts of the present invention and generally designated by the reference numeral 10 will be described.

The system designated as system 10 includes a fire truck 12 having a side extent with an analog gauge 14 mounted thereon. The analog gauge has an indicator 16 pivotally coupled thereto for pivoting between an empty indicia and a full indicia. Note FIGS. 1 & 4. As such, the analog gauge is adapted for indicating a level corresponding to a level signal upon the receipt thereof. As an option, a low warning light 19 may be positioned on the gauge for illuminating upon the receipt of a level signal indicative of a water level below a predetermined amount. The fire truck further includes a front end with a water intake inlet 20 and a gauge outlet 22 mounted thereon. It should be noted that the gauge outlet is connected to the analog gauge via a wire.

As shown in FIG. 1, the present system includes a foldable water tank 24. Such tank has a bottom face and a foldable periphery 26 integrally coupled thereto. The periphery is adapted to extend upwardly upon the filling of the tank with water. For removing water from the tank, a fire hose 28 has a first end connected to the water intake inlet of the fire truck and a second end within the tank. It should be noted that a fireman conventionally controls the removal of water from adjacent the side of the fire trunk.

As shown in FIGS. 2 & 3, an openable sensor housing 30 is provided including a top compartment with a top face, a bottom face, an inboard end face, an outboard end face, and a pair side faces defining an interior space. The sensor housing further has a splash abating tube 32 with a top end coupled to the bottom face of the top compartment adjacent the inboard end face thereof. As shown in FIG. 2, the splash abating tube depends downwardly to terminate at an open beveled bottom end 34.

The sensor housing also has an inverted U-shaped clip 36 coupled to the bottom face of the top compartment adjacent the outboard end face thereof. The clip has a pair of arcuate prongs 38 residing in a plane situated perpendicular with respect to the end faces of the housing. As such, the clip is adapted to be releasably mounted on a top edge of the periphery of the foldable tank such that the splash abating tube is situated vertically within the water therein.

Next provided is an optical distance sensor 40 mounted on the bottom face of the top compartment of the housing. As shown in FIG. 3, the sensor is situated within the top end of the splash abating tube. In such orientation, the optical distance is adapted to continuously generate a level signal corresponding with a level of the water within the tank.

To accomplish this, the sensor is adapted to use the bottom end of the splash abating tube as a reference point and such bottom end in turn abuts the bottom face of the foldable tank. During use, the sensor is adapted to detect a distance from a water level within the tube to the sensor itself. From such distance, a microprocessor 42 that is connected to the sensor is utilized to subtract from the total height of the tube the distance detected. It is now apparent that the tube functions to preclude faulty measurements resulting from disturbances at the surface of the water. It should be noted that any one of numerous different water level sensors may be employed in lieu of the one set forth hereinabove.

Finally, a 10 foot extension cord 44 is provided having a first end connected to the optical distance sensor and microprocessor. A grommet 46 is positioned about the cord at a point at which it exits the sensor housing. A second end of the extension cord is releasably connected to the gauge outlet of the fire truck for transmitting the level signals to the analog gauge. Such releasable coupling is preferably accomplished by way of a plug and socket combination or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foldable water tank remote level detector system comprising:

a fire truck having a side extent with an analog gauge mounted thereon, the analog gauge having an indicator pivotally coupled thereto for pivoting between an empty indicia and a full indicia for indicating a level corresponding to a level signal upon the receipt thereof, the fire truck further including a front end with a water intake inlet and a gauge outlet mounted thereon, wherein the gauge outlet is connected to the analog gauge via a wire;

a foldable water tank including a bottom face and a foldable periphery integrally coupled thereto and extending upwardly therefrom upon the filling of the tank with water;

a fire hose having a first end connected to the water intake inlet of the fire truck and a second end within the tank for removing water therefrom;

a sensor housing including a top compartment with a top face, a bottom face, an inboard end face, an outboard end face, and a pair of side faces defining an interior space, the sensor housing further including a splash abating tube having a top end coupled to the bottom face of the top compartment adjacent the inboard end face thereof and depending downwardly to terminate with an open beveled bottom end, the sensor housing also having an inverted U-shaped clip coupled to the bottom face of the top compartment adjacent the outboard end face thereof, the clip having a pair of arcuate prongs residing in a plane situated perpendicular with respect to the end faces of the housing, whereby the clip is adapted to be releasably mounted on a top edge of the periphery of the foldable tank such that the splash abating tube is situated vertically within the water therein;

an optical distance sensor mounted on the bottom face of the top compartment of the housing and situated within the top end of the splash abating tube thereof, the optical distance adapted to continuously generate a level signal corresponding with a level of the water within the tank; and an extension cord having a first end connected to the optical distance sensor and a second end releasably connected to the gauge outlet of the fire truck thereby transmitting the level signals to the analog gauge.

2. A foldable water tank remote level detector system comprising:

a fire truck having a gauge mounted thereon for indicating a level corresponding to a level signal upon the receipt thereof;

water level sensor means situated within a body of water distant the fire truck, the water level sensor means adapted to continuously generate a level signal corresponding with a level of the water within the body of water; and an extension cord having a first end connected to the water level sensor means and a second end connected to the gauge of the fire truck thereby transmitting the level signals to the gauge;

wherein the fire truck further includes a water intake inlet and a gauge outlet mounted thereon, wherein the gauge outlet is connected to the gauge via a wire and the extension cord is connected to the gauge outlet.

3. A foldable water tank remote level detector system as set forth in claim 2 wherein the body of water is a foldable Water tank including a bottom face and a foldable periphery integrally coupled thereto and extending upwardly therefrom upon the filling of the tank with water.

4. A foldable water tank remote level detector system as set forth in claim 2 wherein the water level sensor means includes an optical distance sensor means.

5. A foldable water tank remote level detector system as set forth in claim 2 wherein the water level sensor means includes a sensor housing with a splash abating tube.

6. A foldable water tank remote level detector system comprising:

a foldable water tank including a bottom face and a foldable periphery integrally coupled thereto and extending upwardly therefrom upon the filling of the tank with water;

a fire truck having a gauge mounted thereon for indicating a level corresponding to a level signal upon the receipt thereof;

a water level sensor mounted on a housing, the water level sensor adapted to continuously generate a level signal corresponding with a level of the water within the water;

an extension cord having a first end connected to the water level sensor and a second end connected to the gauge of the fire truck thereby transmitting the level signals to the gauge;

a splash abating tube connected to the housing of the water sensor and extending downwardly therefrom; and a clip mounted on the housing of the water sensor for removably mounting the water sensor on the periphery of the foldable water such that the splash abating tube depends downwardly into the water.

* * * * *